F. W. BARNACLO.
WEIGHING SCOOP.
APPLICATION FILED JAN. 23, 1918.
1,317,147.
Patented Sept. 23, 1919.
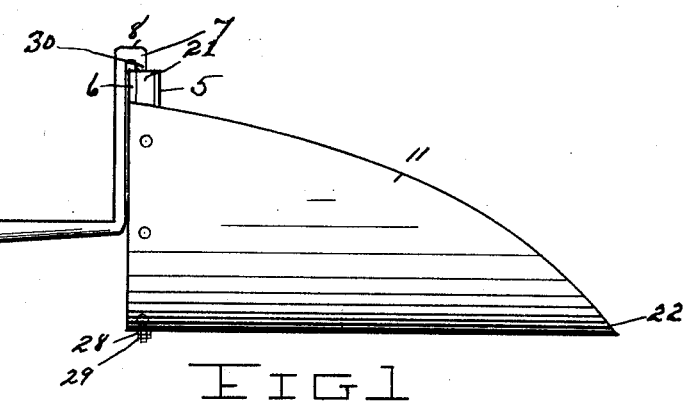
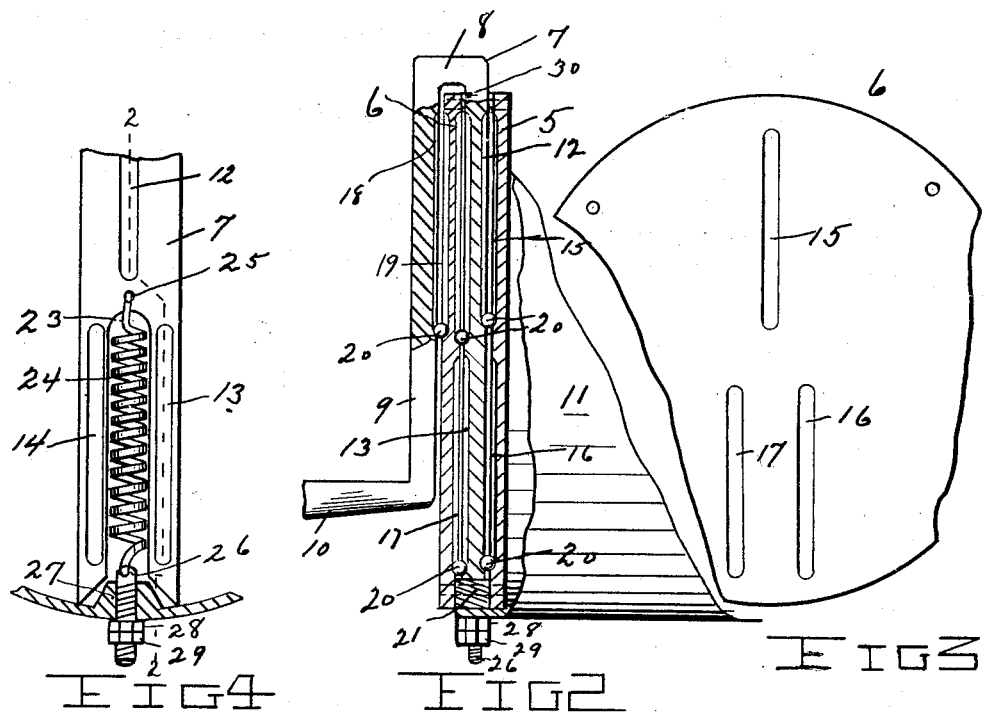
INVENTOR:

UNITED STATES PATENT OFFICE.

FRED W. BARNACLO, OF OKLAHOMA, OKLAHOMA, ASSIGNOR TO ELMER W. FELTS AND QUINCY E. BURKHART, BOTH OF OKLAHOMA, OKLAHOMA.

WEIGHING-SCOOP.

1,317,147.  Specification of Letters Patent.  Patented Sept. 23, 1919.

Application filed January 23, 1918. Serial No. 213,324.

*To all whom it may concern:*

Be it known that I, FRED W. BARNACLO, a citizen of the United States, and a resident of the city of Oklahoma, county of Oklahoma, and State of Oklahoma, have invented a new and useful Invention in Weighing-Scoops, of which the following is a specification, reference also being had to the sheet of drawing accompanying and forming a part of the same.

This invention relates to a dispenser or scoop having in connection therewith, and, as a part thereof, a weighing mechanism, so associated with said dispenser or scoop, as to weigh effectively the contents of the scoop while the latter is being held in the hand.

An object of the invention is to produce a combined weighing mechanism and scoop which while being held in the hand, will weigh the contents of the bowl of the scoop.

Another and an important object of the invention is to so provide the weighing mechanism with such stabilizing qualities as to give correct weight whether the contents of the scoop be at the rear or the toe of the same.

Another object of the invention is to so provide an anti-friction means that will in turn guide certain of the movable parts, so that the anti-friction devices will perform a dual function, and thus reduce parts.

Other objects of the invention will appear from a further reading of the following specification.

On the sheet of drawings, accompanying and forming a part of this specification, Figure 1 is an elevation, including scoop, weighing mechanism and floating handle.

Fig. 2 is a sectional elevational view on the line 2—2 of Fig. 4, partly, and partly fragmented in elevation to show scoop.

Fig. 3 is a detail, fragmented, of a plate connected with the weighing mechanism, and, Fig. 4 is a fragmented view in elevation of a portion of the weighing mechanism.

In these views, similar characters of reference indicate similar parts throughout the drawings.

In order that the weighing mechanism shall not create too much heft in handling the combined scoop and weigher, attention is invited to the simplicity of construction, and use of parts for double purposes.

A pair of plates 5 and 6 are provided, between which is located a bar 7 from which proceeds an arm 8, depending from which is a shank 9 integral with which and extending therefrom is a handle 10, and it may be stated in this connection that the bar, arm, shank and handle may be stamped from one piece and formed as shown in Fig. 2.

The length of the shank 9 is such as to bring the handle 10 below the central line of the weighing mechanism, so that the offset leverage of the scoop extended in another direction may be partly, at least equalized and thus give balance to the structure while in the hand.

As previously stated, the bar 7, arm 8, shank 9 and handle 10 are of one piece, preferably, to create rigidity in these parts. The bar 7 is raced on both sides at 12 and 13, and also on one side at 14, to correspond with races 15, 16, and 17 in the plates 5 and 6. The shank 9, next to the plate 6 is also raced as at 18 to register with a race 19 on that plate on the side opposite to the races, when the parts are assembled, which is accomplished by applying the parts as shown, intervening a ring 21 between the plates 5 and 6. Inventively, this construction, as thus expressed, provides for the movement of the bar 7 and associated handle 10 relatively to the plates and upon anti-friction devices, which also control and guide the movement of the bar 7 making of the anti-friction construction a guiding construction also. Nor, is this all, by so arranging the parts as set forth and described, and especially fitting the parts and rings 21 to avoid lateral, but permitting reciprocating movement, relatively, lost motion is avoided, especially when deposit is on the toe of the scoop and weighing will be more accurate.

The lower end of the bar 7 is bifurcated as at 23 to accommodate a spring 24 which is hooked into an eye 25 in the bar and the free end of that spring is passed into the eye of a bar 26 screw-threaded, and passing through a bushing 27 in the base of the ring 21, or any other suitable place, is provided with jam-nuts 28 and 29. Thus there is provided an adjustable means for controlling the bar 7 and its corresponding parts to make the relative movement between it and the casing formed by the ring and the plates. This construction and means of adjustment will insure correct weighing facilities, especially since the bar 7 near its upper extremity is graduated as at 30 so that they may appear just over the edge of the ring, and indicate the weight of contents in scoop bowl 11.

It is to be said of course that the precise construction named need not obtain in constructing this invention except in so far as it may contribute to the design of the invention, especially in the design of using the anti-friction devices for both making easy movement between parts and guiding that movement in the proper direction.

It might be said again that in devices of this character, some difficulty might ordinarily be had in placing weight on the toe of the scoop 11 and while the handle is in the hand, cause relative pressures such as would bind the bar 7, but the presence of balls 20 on both sides of the bar, and again between shank 9 and plate 6 will obviate this difficulty, and substantially balance the handles and bar construction within the casing of the weighing mechanism and cause it to weigh substantially accurately whether the weight is on the toe or the heel of the bowl 11.

Thus it will be seen that there is provided means forming a part of a scoop or dispenser that will weigh the contents of the scoop while the scoop handle is controlled and without disposing of the scoop-content.

May it be especially observed in this connection that in making this device, care will be taken to so correlate the parts as to prevent lost motion between the parts, balls and races to give movement relatively in axial directions without corresponding movement laterally, thus making the weighing mechanism work definitely and correctly whether the content in the scoop be at the rear or toe thereof.

It will be again seen to be an important feature of the invention the means for forming anti-friction bearings for the parts also provide means for guiding the parts, making an anti-friction and guiding combination out of the same elements. This is not only important in a case of this kind, but substantially a fundamental, since reduction of parts and therefore friction is a needed quality for efficiency.

Having thus described this invention, I claim:

1. A weighing scoop, consisting of a scoop, a case, weighing mechanism within the case, part of which case forms a back for said scoop, a handle attached to said weighing mechanism and floating independent of the scoop, a graduated bar for the weighing mechanism, and for indicating the weight at the periphery of said case, means to regulate and control the movement of the bar, means to adjust the regulating means, and ball bearings on each side of the bar to guide the movement thereof.

2. A weighing scoop, consisting of a scoop, a case having ball races, a weighing mechanism therefor, the case forming a back for the scoop, a bar also having ball races and forming part of the weighing mechanism, balls in said races to prevent all movement except vertical of said bar, means to control the movement of the bar, means to adjust the bar movement controlling means, and means to prevent relative angular movement between the parts, when weight is placed on the toe of the scoop and the handle is under control.

3. A combined scale and scoop consisting of a scoop attached to a scale, the scale-case forming a back for the scoop, a scale bar, the bar having graduations to indicate with the scale-case, the weight in the scoop, the bar being movable independently of the scoop, a handle attached to the bar, said bar being bifurcated, a spring attached to said bar and located in the bifurcation, means to regulate the tension of the spring, races on both sides of the bar, races in the weighing case, corresponding to the races on the bar, balls in said races, said races and balls forming a combined anti-friction bearing and bar guide, and means between the handle and case to prevent the bar from tilting relatively to the case.

Signed at Oklahoma city, in the county of Oklahoma and State of Oklahoma, this 18th day of January, in the year of our Lord nineteen hundred and eighteen.

FRED W. BARNACLO.